(12) United States Patent
Zhang et al.

(10) Patent No.: US 11,518,906 B2
(45) Date of Patent: Dec. 6, 2022

(54) COATING COMPOSITION COMPRISING POLYSILOXANE-MODIFIED POLYURETHANE FOR SOFT-FEEL, STAIN RESISTANT COATINGS

(71) Applicant: Akzo Nobel Coatings International B.V., Amsterdam (NL)

(72) Inventors: Jintao Zhang, Shanghai (CN); Jihai Xu, Shanghai (CN); Jin Hyun Kim, Shanghai (CN); Junbiao Lu, Shanghai (CN)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 17/264,041

(22) PCT Filed: Jul. 26, 2019

(86) PCT No.: PCT/EP2019/070150
§ 371 (c)(1),
(2) Date: Jan. 28, 2021

(87) PCT Pub. No.: WO2020/025469
PCT Pub. Date: Feb. 6, 2020

(65) Prior Publication Data
US 2021/0301171 A1 Sep. 30, 2021

(30) Foreign Application Priority Data

Aug. 2, 2018 (WO) ............... PCT/CN2018/098297
Aug. 27, 2018 (EP) .................................... 18191008

(51) Int. Cl.
C09D 175/06 (2006.01)
C08G 18/10 (2006.01)
(Continued)

(52) U.S. Cl.
CPC ........... *C09D 175/06* (2013.01); *C08G 18/10* (2013.01); *C08G 18/246* (2013.01); *C08G 18/42* (2013.01);
(Continued)

(58) Field of Classification Search
CPC ........ C08G 18/10; C08G 18/42; C08G 18/61; C08G 18/6469; C08G 18/4063;
(Continued)

(56) References Cited

U.S. PATENT DOCUMENTS

| 4,812,518 A | * | 3/1989 | Haubennestel | ........ C08G 18/61 |
| | | | | 525/474 |
| 5,250,614 A | | 10/1993 | Ono et al. | ............... C08L 29/04 |

(Continued)

FOREIGN PATENT DOCUMENTS

| JP | 62205116 A | 9/1987 | ............. C08G 18/61 |
| JP | 06116390 A | 4/1994 | ............. C08G 81/00 |

(Continued)

OTHER PUBLICATIONS

Dieter Stoye et al., Resins for Coatings, Chemistry, Properties and Applications, Hanser Publishers, pp. 323-339.

(Continued)

*Primary Examiner* — Michael M Dollinger
(74) *Attorney, Agent, or Firm* — Pauly, DeVries Smith & Deffner LLC

(57) ABSTRACT

The present disclosure relates to a 2K coating composition comprising a polysiloxane-modified polyurethane and a hardener, wherein the polysiloxane-modified polyurethane obtainable by a method comprising the following steps: a) subjecting a polyol to a reaction with an isocyanate-functional silane coupling agent to obtain a silane-grafted polyol, and b) subjecting the silane-grafted polyol to a condensation reaction with a hydroxyl-functional polysiloxane, to obtain (Continued)

the polysiloxane-modified polyurethane. The polysiloxane-modified polyurethane can be used in a coating composition to form a coating which has smooth feel, stain resistance and easy clean properties, particularly desired in the field of e.g. consumer electronics and automotive industry.

9 Claims, 5 Drawing Sheets

(51) Int. Cl.

| | | |
|---|---|---|
| C08G 18/24 | (2006.01) | |
| C08G 18/42 | (2006.01) | |
| C08G 18/61 | (2006.01) | |
| C08G 18/71 | (2006.01) | |
| C08G 18/73 | (2006.01) | |
| C08G 18/79 | (2006.01) | |
| C08G 77/16 | (2006.01) | |
| C08G 77/458 | (2006.01) | |

(52) U.S. Cl.
CPC ............ *C08G 18/61* (2013.01); *C08G 18/718* (2013.01); *C08G 18/73* (2013.01); *C08G 18/792* (2013.01); *C08G 77/16* (2013.01); *C08G 77/458* (2013.01); *C08G 2150/00* (2013.01)

(58) Field of Classification Search
CPC .. C08G 18/718; C08G 18/73; C08G 18/4692; C08G 77/458; C08G 77/445; C09D 183/10
See application file for complete search history.

(56) References Cited

U.S. PATENT DOCUMENTS

| | | | | |
|---|---|---|---|---|
| 5,262,492 | A * | 11/1993 | Hanada | C08G 18/61 528/26 |
| 5,703,159 | A | 12/1997 | Ichinohe et al. | C08G 77/26 |
| 5,760,155 | A | 6/1998 | Mowrer et al. | C09G 77/04 |
| 6,428,898 | B1 * | 8/2002 | Barsotti | C08G 18/3212 528/21 |
| 7,863,398 | B2 | 1/2011 | Devi et al. | C08G 77/26 |
| 10,633,555 | B2 * | 4/2020 | Stache | C09D 7/63 |
| 2007/0129528 | A1 * | 6/2007 | Huang | C08L 75/04 528/78 |
| 2007/0232735 | A1 * | 10/2007 | Tanaka | C08G 18/289 524/413 |
| 2012/0269977 | A1 * | 10/2012 | Huang | C08G 18/61 524/500 |
| 2016/0152855 | A1 * | 6/2016 | Saito | C08G 18/4063 524/545 |
| 2016/0222169 | A1 | 8/2016 | Hinzmann et al. | C08G 77/445 |

FOREIGN PATENT DOCUMENTS

| | | | |
|---|---|---|---|
| JP | 06256661 A | 9/1994 | ............ C08L 83/10 |
| WO | 2015/039838 A1 | 3/2015 | ............ C08L 83/04 |

OTHER PUBLICATIONS

International Search Report and Written Opinion for corresponding application No. PCT/EP2019/070150 dated Nov. 12, 2019.
European Search Report for corresponding application No. EP18191008.4, dated Mar. 4, 2019.

\* cited by examiner

| Test substance | Test result (left – with chemical, right – after removal) |
|---|---|
| Lipstick (Red), Maybelline | 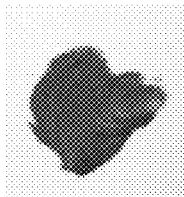 |
| Coffee (Nestle 3 in 1) |  |
| Water Soluble Ink | 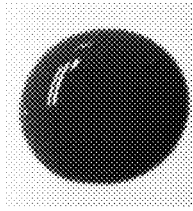 |
| Wax Pencil (Black) | 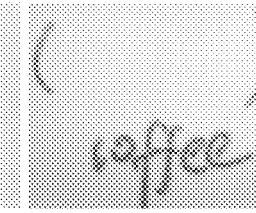 |
| Red Wine – Beaujolais | 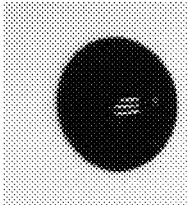 |

(continued)

| | | |
|---|---|---|
| Beer – Heineken | | |
| MonAmi namepen BLACK, 99.3% Alcohol | | |
| SPF30 | | |
| Sunscreen, Banana Boat SPF 30 | | |
| Dish Soap, Ivory | | |
| Fantastic Cleaner | | |

(continued)
| | | |
|---|---|---|
| Mustard, French's Yellow | 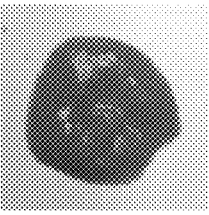 | 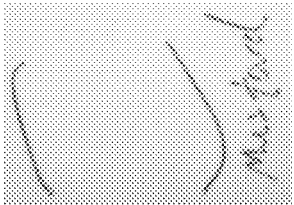 |
| Coca Cola | 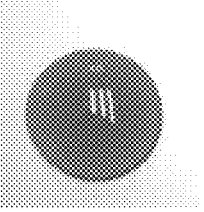 | 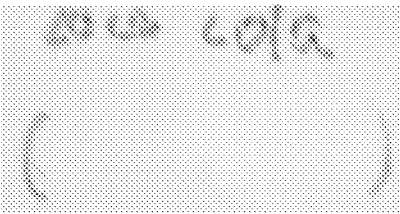 |
| Alcohol, 70% Isopropyl | 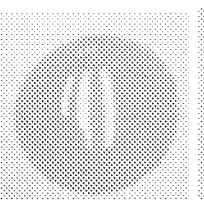 | 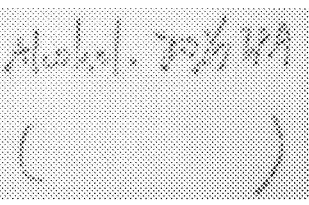 |
| Olive Oil, Extra Virgin• | 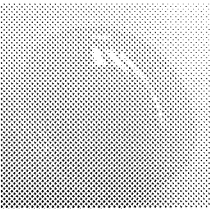 |  |
| Lotion, Vaseline Intensive Care | 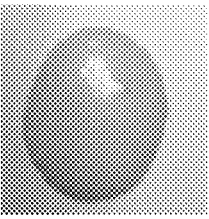 |  |
| Ketchup, Heinz | 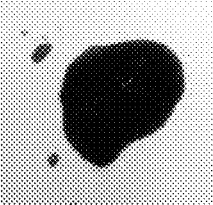 | 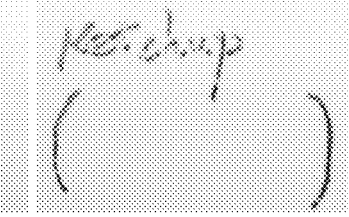 |

(continued)
| | | |
|---|---|---|
| Mayonnaise, Kraft | 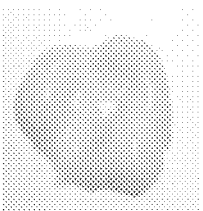 | 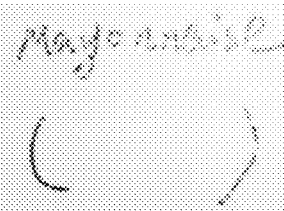 |
| 409 Cleaner | 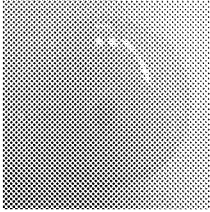 | 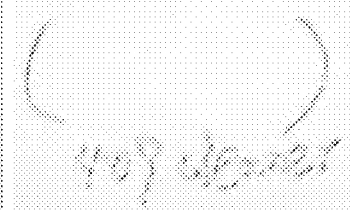 |
| Windex w/ Ammonia | 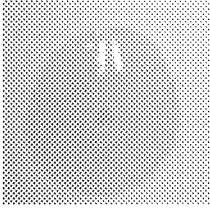 | 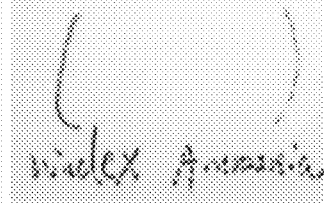 |
| Acetone | 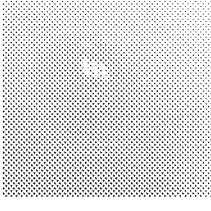 | 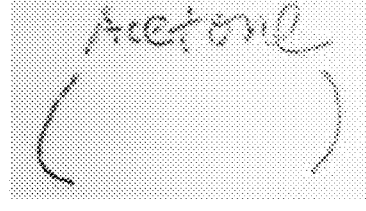 |
| Sweat, Artificial | 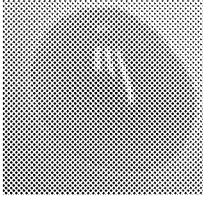 | 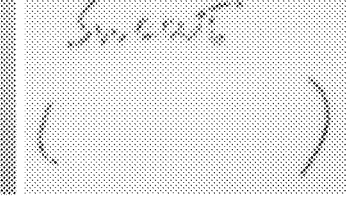 |
| Hand Cream, Fruits & Passion Cucina Coriander & Olive | 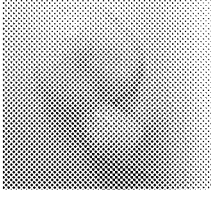 | 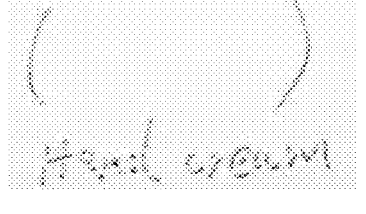 |

(continued)

| | | |
|---|---|---|
| Hair Gel, Loreal Studioline MegaGel | | |
| Lip Polish, Maybelline | | |
| Rouge, Maybelline Expert Wear Blush Beach Plum | | |
| Sebum, Artificial | | |

COATING COMPOSITION COMPRISING POLYSILOXANE-MODIFIED POLYURETHANE FOR SOFT-FEEL, STAIN RESISTANT COATINGS

CROSS-REFERENCE TO RELATED APPLICATIONS

This application is a 35 U.S.C. § 371 national phase application of PCT Application No. PCT/EP2019/070150 (WO 2020/025469 A1), filed on Jul. 26, 2019, which claims the benefit of priority to CN Application No. CN2018/098297, filed on Aug. 2, 2018 and EP Application No. 18191008.4, filed Aug. 27, 2018, each of which is incorporated herein by reference in its entirety.

FIELD OF THE INVENTION

The present invention relates to a coating composition containing polysiloxane-modified polyurethane, for producing coatings with soft-feel and stain resistance properties, which are particularly useful in the field of consumer electronics or automotive industries.

BACKGROUND

In the field of consumer electronic devices such as cellular phones, portable notebooks, laptops, and also automotive industry various substrates are used, such as plastics, metal and glass. It is often desired to cover these substrates with coatings with haptic properties, e.g. soft-feel. Soft-feel coatings can transform hard surfaces into a texture that feels like velvet, silk or rubber.

It is known to create a soft-feel effect by using resins with a low glass transition temperature (Tg) and low cross-link densities. However, such resins and resulting coatings are normally not durable—susceptible to scratch and have a tacky surface. Also such coatings normally have bad staining resistance, e.g. against stains from fingerprints, coffee, etc. For good staining resistance resins with a high Tg and high cross-link densities are necessary. Consequently, the improvement of stain resistance is often accompanied by a deterioration of the soft-feel properties. As a result, most soft-feel coatings are only typically restricted to application on black or other dark substrates where staining is less visible, and not on white or other light coloured substrates. It is however desirable to provide coatings that exhibit a combination of good stain resistance and soft-feel properties.

It is known that silicone-based resins can provide both soft-feel touch and stain resistance due to their physical elasticity and hydrophobic performance. However, most Si-resins are static and attract small particles to the surface (e.g. dust particles).

Thus the surface looks dirty. It is desired to have a surface that looks clean. Other disadvantages of traditional silicone-based resins include poor mechanical properties and poor adhesion to some substrates like plastics.

It is therefore desired to provide a coating that exhibits a combination of good stain resistance and soft-feel properties. It is further desired that such coating has good mechanical properties such as scratch resistance. It is further desired that the coating adheres well to substrates used in consumer electronics or automotive industries, particularly to plastic substrates.

SUMMARY OF THE INVENTION

In order to address the above-mentioned desires, the present invention provides, in a first aspect, a 2K coating composition comprising a polysiloxane-modified polyurethane and a hardener, wherein the polysiloxane-modified polyurethane is obtainable by a method comprising the following steps:

a) subjecting a polyol to a reaction with an isocyanate-functional silane coupling agent to obtain a silane-grafted polyol, b) subjecting the silane-grafted polyol to a condensation reaction with a hydroxyl-functional polysiloxane, to obtain the polysiloxane-modified polyurethane, wherein the polysiloxane-modified polyurethane has a hydroxyl value of at least 30 mg KOH/g, and wherein the hardener comprises at least one isocyanate.

In a further aspect, the invention also provides a method of coating a substrate, comprising applying the coating composition of the invention to a substrate and curing the coating composition to obtain a coated substrate.

In yet another aspect, the present invention provides a coated substrate.

BRIEF DESCRIPTION OF THE DRAWINGS

FIG. 1 is a table containing pictures of substrates with different chemical substances listed in Table 4 and pictures after the removal of the chemical substances to show the results of the stain resistance of the coating prepared in Example 11.

DETAILED DESCRIPTION OF THE INVENTION

The polysiloxane-modified polyurethane used in the present invention can be prepared by a method comprising at least two steps.

In a first synthesis step (a), a polyol is subjected to a reaction with an isocyanate-functional silane coupling agent to obtain a silane-grafted polyol.

As used herein, a "polyol" refers to a compound comprising two or more hydroxyl groups, preferably three or more hydroxyl groups. In some embodiments of the present invention, the polyol can be a polyol selected from a list consisting of polyester polyols, polyurethane polyols, polyether polyols.

Preferably, the polyol used in the synthesis step (a) is a polyester polyol. Polyester polyols can be obtained from alcohol(s) and acid component(s). In a typical example, polyester polyol can be prepared from a mixture comprising at least one diol, at least one polyol comprising 3 or more hydroxyl groups and at least one acid component.

A "diol" is defined as an alcohol that only has two hydroxyl groups. It can be linear, branched, and/or cyclic aliphatic diols. The reaction mixture can comprise one or more aliphatic diols, such as at least two, at least three, or at least four aliphatic diols. Suitable aliphatic diols include ethylene glycol, diethylene glycol, triethylene glycol, 1,2-propylene glycol, 1,3-propane diol, 2-methyl-1,3-propanediol, 1,4-butane diol, 1,5-pentanediol, 2,2,4-trimethyl 1,3-pentanediol, 2,4-diethyl-1,5-pentanediol, 1,6-hexane diol, 2-ethyl-1,3-hexanediol, propylene glycol, tetraethylene glycol, pentaethylene glycol, hexaethylene glycol, heptaethylene glycol, octaethylene glycol, nonaethylene glycol, decaethylene glycol, 1,2-cyclohexanedimethanol, 1,3-cyclohexanedimethanol, 1,4-cyclohexanedimethanol, hydrogenated bisphenol A, and combinations thereof.

The polyol comprising 3 or more hydroxyl groups can include various types of polyols such as aliphatic, aromatic, linear, branched, and/or cyclic polyols comprising 3 or more hydroxyl groups. Suitable polyols comprising 3 or more hydroxyl groups include trimethylolpropane, trimethylolethane, 1,2,5-hexanetriol, polyether triols, di-trimethylol propane, pentaerythritol, di-pentaerythritol, trimethylol butane, glycerol, tris(2-hydroxyethyl) isocyanurate, and combinations thereof.

The acid components may include linear, branched, and/or aromatic acids, the anhydrides and esters thereof. Suitable acids include 1,4-cyclohexanedicarboxylic acid, 1,3-cyclohexanedicarboxylic acid, decahydronaphthalene dicarboxylic acid, 1,3-cyclopentanedicarboxylic acid, 1,1-cyclopropanedicarboxylic acid, hexahydrophthalic acid, hexahydrophthalic anhydride terephthalic acid, isophthalic acid, orthophthalic acid, phthalic anhydride, trimellitic acid, trimellitic anhydride, succinic acid, adipic acid, hydrogenated C36 dimer fatty acids, azelaic acid, sebacic acid, glutaric acid, and combinations thereof.

The polyol used in the synthesis step (a) of the present disclosure preferably has a weight average molecular weight Mw less than 10,000 g/mol, or less than 8,000 g/mol, or less than 5,000 g/mol, or even less than 3,000 g/mol, as determined by gel permeation chromatography (GPC) versus a polystyrene standard with tetrahydrofuran as the mobile phase.

The polyol used in the synthesis step (a) of the present disclosure preferably has a hydroxyl value of greater than 100 mg KOH/g, or at least 105 mg KOH/g, or at least 125 mg KOH/g, or at least 150 mg KOH/g, or at least 175 mg KOH/g, or at least 200 mg KOH/g, or at least 225 mg KOH/g, or at least 250 mg KOH/g, or at least 275 mg KOH/g, or at least 300 mg KOH/g, or at least 325 mg KOH/g. Further, the polyol preferably has a hydroxyl value of up to and including 550 mg KOH/g. The polyol may have a hydroxyl value in the range from 100 to 550 mg KOH/g, from 150 to 425 mg KOH/g, or from 200 to 325 mg KOH/g. The hydroxyl value of the polyester polyol is determined by esterification of the sample with excess acetic anhydride. The excess acetic anhydride is converted to acetic acid by hydrolysis and titrated potentiometrically with standard potassium hydroxide. The volume difference of titrate potassium hydroxide between a blank (no reaction) and the sample corresponds to the acid content of the sample, from which the hydroxyl number is calculated as the number of milligrams of potassium hydroxide needed to neutralize the acid in one gram of sample. The hydrolyzing solution used in the determination is a mixture of dimethylformamide, pyridine, and distilled water, and the acetylating reagent is a mixture of acetic anhydride and dichloroethane with p-toluene sulphonic acid as the catalyst.

Suitable commercially available polyester polyols include Desmophen 800, Desmophen 670, Desmophen 1200, Italester MX 353, Setal 1603 BA-78.

The polyester polyol component can be present in an amount of at least 20 wt. %, at least 40 wt. %, at least 60 wt. %, or at least 80 wt. %, based on the total solid weight of the final resin (polysiloxane-modified polyurethane). The polyester polyol component can be present in an amount up to 90 wt. %, up to 80 wt. %, or up to 70 wt. %, or up to 50 wt. %, based on the total solid weight of the resin. The polyester polyol component can also be present in a range such as from 20 to 90 wt. %, or from 40 to 80 wt. %, or from 60 to 70 wt. %, based on the total solid weight of the final resin.

As used herein, the coupling agent refers to a molecule comprising two or more functional groups that are reactive with other functional groups and which is capable of linking two or more monomers or polymer molecules through chemical bonds. The coupling agent in this disclosure can react with both the polyol and the polysiloxane.

The isocyanate-functional silane coupling agent contains one or more isocyanate groups. Also mixtures of silanes can be used as the isocyanate-functional silane coupling agent. Preferably, it further contains at least one alkoxy group OR attached to the Si atom. In a preferred embodiment, the silane coupling agent comprises at least two and more preferably three alkoxy groups, which may be same or different. Preferably, the silane coupling agent comprises one isocyanate group, optionally bonded to the Si atom through a linking moiety.

In a preferred embodiment, the silane coupling agent has the following formula:

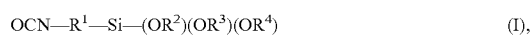

OCN—R$^1$—Si—(OR$^2$)(OR$^3$)(OR$^4$)  (I), wherein R$^1$ is a covalent bond or a bivalent linking moiety, and R$^2$, R$^3$, R$^4$, which can be same or different, are C1-06 alkyl groups. The linking moiety is preferably a bivalent C1-C6 alkyl group.

Preferably R$^1$ is a bivalent alkyl group with 1-6 carbon atoms, more preferably with 1-3 carbon atoms, yet more preferably R$^1$ is a propylene group —C$_3$H$_6$—. Preferably R$^2$, R$^3$ and R$^4$, which can be same or different, are selected from the list consisting of methyl and ethyl groups. More preferably, the isocyanate-functional silane coupling agent is selected from the list consisting of 3-(triethoxysilyl)propyl isocyanate, 3-(trimethoxysilyl)propyl isocyanate, 3-(triethoxysilyl)ethyl isocyanate, 3-(trimethoxysilyl)ethyl isocyanate, and mixtures thereof. Even more preferably, the silane coupling agent is selected from 3-(triethoxysilyl) propyl isocyanate, 3-(trimethoxysilyl)propyl isocyanate and mixtures thereof. Suitable silane coupling agents include USi-SL25, USi-SL35 by Nanjing Union Silicon Chemical, KH550, KH560, KH570, KH792 by Zhejiang Feidian Chemical, DL602, DL171 by Jiangsu Chenguang Coincident Dose.

In the synthesis step (a), the molar ratio of hydroxyl equivalents of the polyol to the isocyanate equivalents of the silane coupling agent can be at least 1.5:1, or at least 2:1, or at least 2.5:1, or at least 3:1, or at least 3.5:1, or at least 4:1, or at least 4.5:1, or at least 5:1, or at least 7.5:1, or at least 8:1. The molar ratio is preferably not higher than 10:1. Preferred molar ratios include from 1.5:1 to 3.5:1, or from 1.8:1 to 3.0:1, or from 2.0:1 to 3.0:1. Excess of hydroxyl group equivalents ensures that during the reaction of the polyol with the silane coupling agent, at least some of the hydroxyl groups of the polyol remain unreacted, which may beneficial in the final curing of the coating composition, when used in 2K coating compositions.

The functional silane coupling agent can be present in an amount of at least 5 wt. %, at least 10 wt. %, at least 15 wt. %, or at least 20 wt. %, or at least 25 wt. %, or at least 30 wt. %, based on the total solid weight of the final resin (polysiloxane-modified polyurethane). The functional silane can be present in an amount up to 50 wt. %, up to 40 wt. %, or up to 30 wt. %, or up to 20 wt. %, based on the total solid weight of the final resin. The functional silane can also be present in a range such as from 10 to 50 wt. %, or from 15 to 40 wt. %, or from 20 to 30 wt. %, based on the total solid weight of the final resin.

The reaction between hydroxyl groups in the polyol and the isocyanate groups of the silane coupling agent can be carried out in the presence of a catalyst. Conventional catalysts known in the art for such a reaction can be used, e.g. metal, acidic or alkaline catalysts. Preferably, the reaction is carried out in the presence of a metal catalyst, e.g. an organotin compound. More preferably, the catalyst is dibutyltin dilaurate (DBTDL). Other metal catalysts can also be used, such as stannous octoate, zirconium or titanium based catalysts. The use of a catalyst can help to drive the reaction to completion. It is preferred to allow the reaction to proceed until no detectable free NCO groups are left.

The catalyst can be used in an amount of at least 0.1 wt. %, at least 0.5 wt. %, at least 1 wt. %, or at least 3 wt. %, or at least 5 wt. %, or at least 10 wt. %, based on the total solid weight of the final resin. The catalyst can also be present in a range such as from 0.1 to 10 wt. %, or from 0.5 to 5 wt. %, or from 1 to 3 wt. %, based on the total solid weight of the final resin.

In a second synthesis step (b), the silane-grafted polyol obtained in synthesis step (a) is subjected to a condensation reaction with a hydroxyl-functional polysiloxane, to obtain the polysiloxane-modified polyurethane.

The hydroxyl-functional polysiloxane is preferably a linear polysiloxane chain of the formula —(Si($R^4$)($R^5$)—O—) and two end OH groups. This is also called silanol terminated silicone oil. Groups $R^4$ and $R^5$ can be the same or different and are preferably selected from linear C1-C6 alkyl groups. More preferably, $R^4$ and $R^5$ are selected from methyl and ethyl groups, more preferably both $R^4$ and $R^5$ are methyl groups. The preferred hydroxyl-functional polysiloxane is dihydroxy poly(dimethylsiloxane) (DHPDMS).

Suitable hydroxyl-functional polysiloxanes are commercially available as silanol-terminated silicone oils with different viscosities, for example, Andisil® OH 50,000 (50,000 cps), Andisil® OH 4,000 (4,000 cps), Andisil® OH 1,000 (1,000 cps), Andisil® OH 40 (40 cps).

In some embodiments it may be preferred to use a mixture of at least two hydroxyl-functional polysiloxanes with different viscosities. Particularly good results were obtained with respect to soft-feel properties when a mixture of a polysiloxane with a viscosity above 20,000 cps at 25° C. and a polysiloxane with a viscosity below 20,000 cps at 25° C. was used. More preferably, such mixture contains a first polysiloxane with a viscosity in the range 25,000-80,000 cps at 25° C. and a second polysiloxane with a viscosity in the range 40-20,000 cps at 25° C. Preferably, both polysiloxanes in this embodiment are dihydroxy poly(dimethylsiloxane). The viscosity is typically provided by the supplier of the silicone oil.

The functional polysiloxane can be present in an amount of at least 0.5 wt. %, at least 1 wt. %, at least 5 wt. %, or at least 10 wt. %, or at least 20 wt. %, or at least 30 wt. %, based on the total solid weight of the final resin. The polysiloxane can be present in an amount up to 50 wt. %, up to 40 wt. %, or up to 25 wt. %, or up to 15 wt. %, based on the total solid weight of the final resin. The polysiloxane can also be present in a range such as from 0.5 to 50 wt. %, or from 5 to 25 wt. %, or from 10 to 15 wt. %, based on the total solid weight of the final resin.

In the reaction step (b), the molar ratio of the alkoxy-groups present in the silane grafted polyol to the hydroxyl groups of the polysiloxane is preferably 1.5:1 or greater, 3:1 or greater, 5:1 or greater, 10:1 or greater, 100:1 or greater, or even 1,000:1 or greater. The molar ratio can be as high as 1,000,000:1. The molar ratio can be in the range of from 1.5:1 to 1,000,000:1, or from 10:1 to 100,000:1, or from 1,000:1 to 10,000:1.

The second step (b) is preferably performed in the presence of a catalyst for condensation reactions. Conventional catalysts known in the art for such a reaction can be used, e.g. metal, acidic or alkaline catalysts. Preferably, the reaction is carried out in the presence of a metal catalyst, e.g. an organotin compound such as dibutyltin dilaurate or dibutyltin bis(acetylacetonate). More preferably, the catalyst is dibutyltin dilaurate (DBTDL).

The condensation catalyst can be used in an amount of at least 0.1 wt. %, at least 0.5 wt. %, at least 1 wt. %, or at least 3 wt. %, or at least 5 wt. %, or at least 10 wt. %, based on the total solid weight of the final resin. The condensation catalyst component can be used in a range such as from 0.1 to 10 wt. %, or from 0.5 to 5 wt. %, or from 1 to 3 wt. %, based on the total solid weight of the final resin.

The polysiloxane-modified polyurethane obtained as a result of the above described steps, preferably has a number average molecular weight Mn of at least 1,000, or at least 1,500, or at least 2,000, or at least 3,000, or at least 5,000. The Mn can be up to 1,000,000, or up to 100,000, or up to 10,000. For example, the Mn of the polysiloxane-modified polyurethane can be in the range from 1,000 to 1,000,000, or from 1,500 to 10,000, or from 2,000 to 5,000. Mn can be determined by gel permeation chromatography (GPC) using a polystyrene standard with tetrahydrofuran as the mobile phase.

The polysiloxane-modified polyurethane has a hydroxyl value of at least 30 mg KOH/g. Preferably, it has a hydroxyl value of at least 50 mg KOH/g, or at least 100 mg KOH/g, or at least 150 mg KOH/g, or at least 200 mg KOH/g, or at least 250 mg KOH/g. The hydroxyl value is preferably not higher than 300 mg KOH/g. In some embodiments, the polysiloxane-modified polyurethane has a hydroxyl value in the range from 30 to 300 mg KOH/g, from 50 to 250 mg KOH/g, or from 100 to 150 mg KOH/g. OH value can be determined by esterification of the sample with excess acetic anhydride as described above.

Preferably, the polysiloxane-modified polyurethane does not have carboxyl functionality. The acidic value is preferably 0 mg KOH/g.

In some embodiments, the polysiloxane-modified polyurethane may still have some alkoxy —OR groups (e.g. —$OR^2$, —$OR^3$ and/or —$OR^4$) left unreacted after synthesis step (b). These groups can then take part in the curing reaction with a hardener, if the polyurethane is used in a 2K composition. In addition, these alkoxy groups can also react with the substrate (e.g. glass, metal, plastic) to provide for a better adherence of the polymer to the substrate. For example, for glass, —OR groups can interact with the —Si—OH groups on the surface; for metal, e.g. Al, they can interact with Al—O groups on the surface.

In another aspect, the present invention provides a coating composition comprising the above-described polysiloxane-modified polyurethane.

The coating composition is provided in the form of a two-component (2K) coating composition. The handling of two-component coating compositions generally requires mixing together the reactive components shortly before application to avoid premature reaction of the reactive components. The term "shortly before application" is well-known to a person skilled in the art handling two-component coating compositions. The time period within which the ready-to-use coating composition may be prepared prior to the actual use/application depends, e.g., on the pot life of the coating composition. The pot life is the time within which, once the mutually reactive components of a coating composition have been mixed, the coating composition may still be properly processed or applied and coatings of unimpaired quality can be achieved.

The coating composition according to the present disclosure preferably comprises the above-described polysiloxane-modified polyurethane in a first component A and a hardener in a second component B.

The polysiloxane-modified polyurethane can be present in an amount of least 10 wt. %, at least 15 wt. %, at least 20 wt. %, at least 25 wt. %, at least 30 wt. %, at least 40 wt. %, or at least 50 wt. %, based on the total solid weight of the coating composition. In some embodiments, the coating composition can comprise up to 70 wt. %, up to 60 wt. %, or up to 50 wt. %, or up to 30 wt. % of the polysiloxane-modified polyurethane, based on the total solid weight of the coating composition. For example, the coating composition can comprise from 10 to 70 wt. %, or from 20 to 50 wt. %, or from 25 to 30 wt. % of the polysiloxane-modified polyurethane, based on the total solid weight of the coating composition.

As used herein, a hardener refers to a compound comprising two or more functional groups that are reactive with other functional groups and which is capable of linking two or more monomers or polymer molecules through chemical bonds. It will be appreciated that the coating compositions of the present invention can cure through the reaction between the functional groups of the final polysiloxane-modified polyurethane and the functional groups of the hardener to form the coating. "Curing" refers to bond formation resulting in the formation of a crosslinked coating. Curing may occur upon application of an external stimulus, preferably, heat.

The hardener in the present invention comprises groups that are reactive towards the groups present in the polysiloxane-modified polyurethane.

Particularly, the hardener comprises at least one isocyanate. Non-limiting examples of isocyanates include multifunctional isocyanates (polyisocyanates) such as linear, branched, and/or cyclic polyisocyanates. Examples of multifunctional polyisocyanates include aliphatic diisocyanates such as hexamethylene diisocyanate and isophorone diisocyanate, and aromatic diisocyanates such as toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates. Suitable polyisocyanates are well known in the art and widely available commercially. Examples of commercially available isocyanates include DESMODUR® N 3300A, DESMODUR® Z 4470BA, DESMODUR® N 3790, and DESMODUR® N 3900, which are commercially available from Bayer Corporation.

When an isocyanate-containing hardener is used, the molar ratio of the —NCO groups in the hardener to the hydroxyl groups in the polysiloxane-modified polyurethane can for example be 1:1 or greater, 1.5:1 or greater, 2:1 or greater, 2.5:1 or greater, 3:1 or greater, or 4:1 or greater. The molar ratio can preferably be up to 10:1. The molar ratio can for example be in the range from 1:1 to 10:1, or from 1.5:1 to 5:1, or from 1:1 to 3:1. The desired molar ratio can be achieved by using a corresponding mixing ratio of the first component (comprising the polyurethane) and the second component (comprising the hardener) of the coating composition.

The hardener can be present in an amount of at least 20 wt. %, at least 40 wt. %, at least 60 wt. %, or at least 80 wt. %, based on the total solid weight of the coating composition. The hardener can be present in an amount up to 90 wt. %, up to 70 wt. %, or up to 50 wt. %, or up to 30 wt. %, based on the total solid weight of coating composition. The hardener can be present in a range such as from 20 to 90 wt. %, or from 40 to 70 wt. %, or from 60 to 65 wt. %, based on the total solid weight of the coating composition.

The coating composition can further comprise a catalyst for the reaction between the polysiloxane-modified polyurethane and the hardener. The catalyst can for example be acidic or alkaline. Preferably a metal catalyst is used. Suitable catalysts include organic tin catalysts such as DBTDL. The catalyst can be present in an amount of at least 0.1 wt. %, at least 0.5 wt. %, at least 1 wt. %, or at least 3 wt. %, or at least 5 wt. %, based on the total solid weight of the coating composition. The catalyst can for example be present in a range from 0.1 to 10 wt. %, or from 0.5 to 5 wt. %, or from 1 to 3 wt. %, based on the total solid weight of the coating composition.

The coating composition can be water-borne or solvent-borne. Preferably, the coating composition is solvent-borne. Solvent-borne are coating compositions that comprise organic solvents as the major liquid phase when preparing and/or applying the coating composition. "Major liquid phase" means that the organic solvents constitute at least 50 wt. % of the liquid phase, preferably at least 80 wt. %, more preferably at least 90 wt. %, in some embodiments even 100 wt. %. Usually, solvent-borne coating compositions contain 20 to 80% by weight of organic solvents, based on the total weight of the coating composition. Optionally, they can also contain up to 15% by weight, preferably, below 5% by weight of water, based on the total weight of the coating composition. It may be preferred in some embodiments that the coating composition is non-aqueous (does not comprise water).

Example of suitable organic solvents include alcohols (such as ethanol, isopropanol, n-butanol, n-propanol), esters (such as ethyl acetate, propyl acetate), aromatic solvents (such as toluene), ketone solvents (such as acetone, methyl ethyl ketone, methyl isobutyl ketone, cyclohexanone, diacetone alcohol); aliphatic hydrocarbons; chlorinated hydrocarbons (such as $CH_2Cl_2$); ethers (such as diethyl ether, tetrahydrofuran) and mixtures thereof. Preferred organic solvents include butyl acetate, methyl isobutyl ketone (MIBK), methyl ethyl ketone (MEK) and methoxy propyl acetate (PMA), or mixtures thereof.

The solid content of the coating composition can be in the range from 10 to 90 wt. %, preferably 25 to 75 wt. %, more preferably 40 to 65 wt. %.

The coating composition can further comprise conventional additives. For example, additives such as matting agent to lower gloss, to improve scratch resistance, to control viscosity, and to enhance soft touch properties. The matting agent can be inorganic and/or organic particles, for example silica, wax-treated silica, pyrogenic silica, silicone microbeads, metal oxides, micronized wax, polyether condensate, polyamide microbeads, polyurethane microbeads, and combinations thereof. Examples of commercially available matting agents include EVONIK Acematt 3600, EVONIK Acematt 3300, EVONIK Acematt 3400, KMP 601, KMP 600, KMP 602. The matt agent can be present in an amount at least 1 wt. %, or at least 4 wt. %, or at least 8 wt. %, or at least 15 wt. %, or at least 20 wt. %, or at least 30 wt. %, based on the total solid weight of the coating composition. The matting agent can for example be present in an amount from 1 to 30 wt. %, or from 4 to 20 wt. %, or from 8 to 15 wt. %, based on the total solid weight of the coating composition.

Other examples of additives that can be used in the coating composition of the present invention include pigments, abrasion resistant particles, flow and surface control agents, thixotropic agents, organic solvents, organic co-solvents, reactive diluents, reaction inhibitors, and others.

The present invention further provides a method of coating a substrate, comprising applying the coating composition according to the invention to a substrate and curing the coating composition to obtain a coated substrate.

The coating composition according to the present invention can be applied to a wide range of substrates including metallic and non-metallic substrates. Suitable substrates include aluminum, aluminum alloys, polycarbonate acrylonitrile butadiene styrene (PC/ABS), polycarbonate, polyacrylate, polyolefin, polyamide, polystyrene, polyamide, glass, wood, stone, and the like.

The coating composition according to the present invention can be applied to the substrate by any suitable means known in the art, such as spraying, electrostatic spraying, dipping, rolling, brushing, electro-coating and the like. The coating compositions of the present invention can be applied to achieve a dry film thickness of for example 10 μm to 100 μm, 20 μm to 70 μm, or 40 μm to 60 μm.

Curing of the coating composition can be done at ambient conditions, e.g. room temperature. Room temperature is understood here as from 15 to 30° C. The curing can be accelerated by external stimuli, for example, by heating. Preferably, the coated substrate is heated at a temperature in the range 40-100° C., more preferably 60-90° C. Conventional methods can be used, e.g. placing in an oven.

The coating composition according to the present invention can be used as a single layer applied directly to the substrate, or in multilayer systems, e.g. in combination with a primer and/or basecoat layers.

The coating composition according to the present invention can be used in various coating industries, such as, consumer electronics, automotive, packaging, wood flooring and furniture, glass and windows, sports equipment.

The present invention further provides a coated substrate coated with a coating obtained by curing the coating composition on a substrate. The coatings formed from the coating composition according to the present invention have exceptionally good general properties including adhesion, hardness, wear resistance, scratch resistance, weather resistance and UV resistance. In addition, the coatings also have soft-feel properties.

Importantly, the coatings formed from the coating compositions of the present invention have good stain resistance and easy clean property, as will be apparent from the examples. For example, a series of chemicals including Sunscreen, Dish Soap, Fantastic Cleaner, Mustard, Alcohol, Olive Oil, Rouge and Hand Cream were applied to coated white panels and allowed for extended soak at room ambient temperature for 168 hours, after which the chemicals were removed. By comparing the coated surfaces before and after the soak, it was observed that the coated substrates according to the present invention do not show discoloration or peel off. In addition, the coatings also meet the adhesion and abrasion requirements.

Without wishing to be bound by particular theory, it is believed that the unique combination of properties of the coating based on the above-described polyurethane is due to its unique structure, wherein different segments from the polyol, silane coupling agent and the polysiloxane are combined in an advantageous way. This achieves the best balance of soft-feel, stain-resistance and mechanical properties.

EXAMPLES

The invention will be demonstrated with reference to the following examples. All parts and percentages are by weight unless specified otherwise.

Desmophen® 800—highly branched polyester polyol from Covestro, hydroxyl value: 283 mg KOH/g.

Desmophen® 670—slightly branched hydroxyl-functional polyester from Covestro, hydroxyl value: 142 mg KOH/g.

Italester MX 353—saturated polyester available from Galstaff Mutiresine, hydroxyl value: 102 mg KOH/g.

DBTDL—dibutyltin dilaurate

Silane USi-SL25—3-(triethoxysilyl)propyl isocyanate from Nanjing Union Silicon Chemical Andisil® OH 50,000—silanol terminated silicone oil 50,000 cps available from AB Specialty Silicones Andisil® OH 4,000—silanol terminated silicone oil 4,000 cps available from AB Specialty Silicones Acematt® 3600—matting agent based on polymer-treated precipitated silica available from Evonik Industries AG.

MIBK—methyl isobutyl ketone

MEK—methyl ethyl ketone

PMA—methoxy propyl acetate

BYK® 3700—silicone-based surface additive available from Byk

BYK® 306—silicone-containing surface additive available from Byk

Desmodur® N 3790 BA—polyisocyanate (high functional HDI trimer) supplied at 90% solids in n-butyl acetate available from Covestro Desmodur® N 3300 BA—polyisocyanate (HDI isocyanurate) supplied at 90% solids in n-butyl acetate available from Covestro KMP 600—lubricant based on fine-grained hybrid silicone powder available from Shin-Etsu Examples 1-10: Preparation of Polysiloxane-Modified Polyurethane Example 1: Firstly, 200 g Desmophen® 800, 74 g butyl acetate and 1 g DBTDL are stirred at 60° C. and to this mixture 66 g Silane USi-SL25 was dropped in the solution for about 30 min under nitrogen. Then the temperature was raised to 80° C. for about 1 hour and the reaction is allowed to proceed until no free NCO could be detected. Secondly, 40 g Andisil® OH 50,000 and 175 g butyl acetate were added into the reaction solution at 80° C. The temperature was then raised to 120° C. for about 4.5 hours to allow the reaction to proceed. Finally, 465 g butyl acetate was added into the system and the system was cooled down to 50° C. The product was filtered with a 50 μm filter paper and stored in a container. The Mn of the obtained resin was about 2818 with polydispersity index (PDI) 22.806, as determined by GPC. The OH value was about 50 mg KOH/g determined by the esterification method as previously described.

Example 2-10: The synthesis method is the same as that of Example 1. The compounds used in the synthesis and their amounts in weight parts are recited in Table 1. Examples 1-3 use polyester polyols with different hydroxyl values. Examples 1, 4 and 5 have different NCO/OH ratio. Examples 1, 6, 7 and 8 have different OH-functional silicone oil. Compared to Example 1, the catalyst contents of Example 9 and 10 are changed.

TABLE 1

| Example | 1 | 2 | 3 | 4 | 5 | 6 | 7 | 8 | 9 | 10 |
|---|---|---|---|---|---|---|---|---|---|---|
| Desmophen ® 800 | 20 | | | 20 | 20 | 20 | 20 | 20 | 20 | 20 |
| Desmophen ® 670 | | 20 | | | | | | | | |
| Italester MX 353 | | | 20 | | | | | | | |
| Silane USi-SL25 | 6.5 | 6.5 | 6.5 | 8 | 4 | 6.5 | 6.5 | 6.5 | 6.5 | 6.5 |
| Andisil ® OH 50,000 | 4 | 4 | 4 | 4 | 4 | 2 | 8 | 2 | 4 | 4 |
| Andisil ® OH 4,000 | | | | | | | | 2 | | |
| DBTDL | 1 | 1 | 1 | 1 | 1 | 1 | 1 | 1 | 0.5 | 1.5 |

Example 11: Preparation of a Coating from Example 1

A coating composition based on the resin obtained in Example 1 was prepared with the components listed in Table 2 in weight percentages. The compounds were mixed in the order as they are listed in the table, to separately obtain components A and B.

Component A and B were mixed at a molar ratio NCO/OH of 1.97. The mixture was allowed to stand for 30 minutes. The solution was filtered with a 50 µm filter paper and then sprayed onto white colored polycarbonate/acrylonitrile butadiene styrene (PC/ABS) panels. The coated panels were allowed to evaporate the excess of the solvents for 5 minutes at ambient temperature, before being placed in a heated oven at 80° C. for 2 hours. The coatings had a dry film thickness of about 40-60 µm.

TABLE 2

| component A | wt. % | component B | wt. % |
|---|---|---|---|
| Resin from Example 1 | 30 | Desmodur ® N 3790 BA | 10 |
| Acematt ® 3600 | 4 | | |
| butyl acetate | 19.7 | | |
| MIBK | 10 | | |
| MEK | 20 | | |
| PMA | 6 | | |
| BYK ® 3700 | 0.1 | | |
| BYK ® 306 | 0.1 | | |
| DBTDL | 0.1 | | |

General properties of the coating prepared according to Example 11 were tested. The test methods and results are shown in Table 3.

TABLE 3

| Test Item | Test Method | Specification | Test Result |
|---|---|---|---|
| Appearance | Visual | | Normal |
| Adhesion | ASTM 3359; 3M 600 tape; 1.0 mm × 1.0 mm | 5B | Pass |
| Pencil Hardness | Mitsubishi Uni pencil; 1000 g loading | H | Pass |
| Abrasion (RCA) | ASTM F2357; Norman Abrasion Wear Tester (7-IBB-647); Load 175 g | No exposure to substrate | Pass |
| Solvent Cure | Alcohol 99.3%; 500 g loading, 250 double rubs | No exposure to adjacent underlying layer after test | Pass |
| Color Stability (QUV) | ASTM G154 UVA-340, 0.71 W/m²/nm ultraviolet lamp and 60° C., 96 hours | ΔEcmc ≤ 4.0. Meets adhesion and abrasion requirements | Pass |
| Boiling test | 98° C. ± 2° C., 30 min | No adhesion loss or visual crazing or cracks | Pass |
| Hammer impact | 500 g, 50 cm | No glass planar fragmentized | Pass |
| Salt mist | 5% NaCl, 35° C., 72 hr, water, RT. 4 hr, x-cutting | No dissolution, blistering, cracking, chipping and peeling off | Pass |
| High Humidity Thermal Shock | 50° C., 95% RH; 366 hr | No coating dissolution, blistering, cracking, chipping and peeling off | Pass |
| Humidity test - High/Low cycle | ASTM D3359 HP Document 286423 | The surface finish does not discolor or fade and passes adhesion and abrasion requirements. No coating dissolution, blistering, cracking, chipping and peeling off | Pass |

As follows from the table, the general properties of the obtained coating are very good and pass all the tests.

The stain resistance of the coating prepared in Example 11 was evaluated with different chemical substances as listed in Table 4. The results are listed in Table 4 and shown in FIG. 1. FIG. 1 contains pictures of the substrates with the chemical and after the removal of the chemical.

TABLE 4

| Specification | Test chemical | Test result |
|---|---|---|
| 1 hour at room temperature. No discoloration and peel off. Meet adhesion and abrasion requirements | Lipstick(Red), Maybelline | Pass |
| | Coffee (Nestle 3 in 1) | Pass |
| | Water Soluble Ink | Pass |
| | Wax Pencil (Black) | Pass |
| | Red Wine - Beaujolais | Pass |
| | Beer - Heineken | Pass |
| 50° C./95% RH, 1 hr; No soaking 80° C./80% RH, 24 hr; No adhesion loss or visual crazing or cracks Apply chemical with Q-tip and perform 168 hours extended soak at room ambient. After removal of the chemicals, no discoloration and peel off. Meet adhesion and abrasion requirements. | MonAmi namepen BLACK, 99.3% Alcohol | Pass |
| | SPF30 | Pass |
| | Sunscreen, Banana Boat SPF 30 | Pass |
| | Dish Soap, Ivory | Pass |
| | Fantastic Cleaner | Pass |
| | Mustard, French's Yellow | Pass |
| | Coca Cola | Pass |
| | Alcohol, 70% Isopropyl | Pass |
| | Olive Oil, Extra Virgin | Pass |
| | Lotion, Vaseline Intensive Care | Pass |
| | Ketchup, Heinz | Pass |
| | Mayonnaise, Kraft | Pass |
| | 409 Cleaner | Pass |
| | Windex w/Ammonia | Pass |
| | Acetone | Pass |
| | Sweat, Artificial | Pass |

TABLE 4-continued

| Specification | Test chemical | Test result |
|---|---|---|
| | Hand Cream, Fruits & Passion Cucina Coriander & Olive | Pass |
| | Hair Gel, Loreal Studioline MegaGel | Pass |
| | Lip Polish, Maybelline | Pass |
| | Rouge, Maybelline Expert Wear Blush Beach Plum | Pass |
| | Sebum, Artificial | Pass |

As seen from the table and the FIGURE, the coatings according to the invention possess very good stain resistance.

Examples 12-20: Preparation of Coatings from Examples 2-10

The coating compositions were formulated in the same way as in Example 11 but using the polysiloxane-modified polyurethanes from Example 2-10. The abrasion (RCA), stain resistance and soft-feel testing results are listed in Table 5.

TABLE 5

| Example | Resin | Abrasion (RCA) | Smooth feeling | Stain resistance |
|---|---|---|---|---|
| 12 | Example 2 | pass | good | pass |
| 13 | Example 3 | did not pass | soft | did not pass |
| 14 | Example 4 | pass | good | pass |
| 15 | Example 5 | slightly less | general | slightly less |
| 16 | Example 6 | pass | good | pass |
| 17 | Example 7 | pass | oil slick | pass |
| 18 | Example 8 | pass | good | pass |
| 19 | Example 9 | slightly less | general | slightly less |
| 20 | Example 10 | pass | good | pass |

Slightly less means still acceptable but less good than "pass". General means still acceptable but less good than "good".

Example 11, 12 and 13 use different polysiloxane-modified polyurethanes synthesized from different polyester polyols with different hydroxyl values. Example 13 uses the resin obtained in Example 3, based on a polyester polyol Italester MX 353 with the hydroxyl value of 102 mg KOH/g. Although it gives a soft smooth feeling, the coating is too soft to pass RCA and stain resistance tests. It is believed by the inventors that a too low OH value of the polyol in synthesis step (a) leads to a low crosslinking density, which in turn contributes to the softness of the coating.

Different silane coupling agent contents were tried. In Example 15, relatively less silane coupling agent was used, as compared for instance to Example 14. Inventors believe that this decreased the crosslinking density of the coating to some extent, resulting in the slightly worse abrasion and stain resistance. Also it is believed that the less smooth feeling may be due to the less dense surface structure.

Different catalyst contents were also tried. Example 19 uses less catalyst than Example 20. A lower catalyst amount is believed by the present inventors to slow down the condensation reaction, which can lead to a resin with lower molecular weight and less film-forming property desired in a coating.

It is further believed by the inventors that the polysiloxane chains in the polyurethane resin possess hydrophobicity and have a great impact on the stain resistance of the polymer and thus the final coating. Silicone oil used in the synthesis of the resin normally contains chains of different length and hence different viscosity. Example 17, wherein relatively much of a silicone oil with relatively high viscosity was used in the synthesis, resulted in an oil slick observed on the coating surface. This can be ascribed to the excess of silicone oil, some of which may have not reacted into the resulted polymer. Very good results are achieved in Example 18, where a mixture of a low viscosity and a high viscosity silicone oils was used.

Examples 21-26: Preparation of Coatings Based on Example 1

Coatings based on the polysiloxane-modified polyurethane obtained in Example 1 were prepared with varying other components to improve the performance. The preparation method is the same as Example 11 with the ingredients listed in Table 6.

TABLE 6

| Example | 11 | 21 | 22 | 23 | 24 | 25 | 26 |
|---|---|---|---|---|---|---|---|
| resin of Example 1 | 30 | 30 | 30 | 30 | 30 | 30 | 30 |
| Acematt ® 3600 | 4 | 2 | 4 | 4 | 4 | 4 | 4 |
| KMP 600 | | 2 | 4 | | | | |
| butyl acetate | 19.7 | 19.7 | 19.7 | 19.7 | 19.7 | 19.7 | 7 |
| MIBK | 10 | 10 | 10 | 10 | 10 | 10 | 6 |
| MEK | 20 | 20 | 20 | 20 | 20 | 20 | 12 |
| PMA | 6 | 6 | 6 | 6 | 6 | 6 | 3.6 |
| BYK ® 3700 | 0.1 | 0.1 | 0.1 | 0.1 | 0.1 | 0.1 | 0.1 |
| BYK ® 306 | 0.1 | 0.1 | 0.1 | 0.1 | 0.1 | 0.1 | 0.1 |
| DBTDL | 0.1 | 0.1 | 0.1 | 0.1 | 0.1 | 0.05 | 0.1 |
| Desmodur ® N 3790 BA | 10 | 10 | 10 | | 15 | 10 | 10 |
| Desmodur ® N 3300 BA | | | | 10 | | | |
| Solid content | 25 | 25 | 25 | 25 | 25 | 25 | 30 |
| Abrasion (RCA) | pass | pass | pass | pass | pass | Not pass | pass |
| Smooth feeling | good | Very good | tacky | good | good | Slightly less | Slightly less |
| Stain resistance | pass | pass | Slightly less | pass | pass | Not pass | pass |

Compared to Example 11, half of Acematt® 3600 is replaced by KMP 600 in Example 21 while the same amount of KMP 600 is added in Example 22. The result is that the coating of Example 21 has more smooth feeling, which may be explained by the smaller particle size of the additive. However, a too high amount of the matt powders appears to bring more rough surface structure, resulting in the tacky feeling and less stain resistance (Example 22).

In Examples 23 and 24 the kind and amount of hardeners are varied. However as can be seen from the table this did not negatively affect the properties. Therefore, coatings with desired properties can be obtained by using different hardeners.

In Example 25 the catalyst content is decreased, which is believed to slow down the curing and/or result in an incompletely cured coating with poorer properties.

In Example 26 the solid content is increased to 30 wt. %, which resulted in a coating with an acceptable but slightly less smooth feel.

The invention claimed is:

1. A 2K coating composition comprising a polysiloxane-modified polyurethane and a hardener, wherein the polysiloxane-modified polyurethane is obtainable by a method comprising the following steps:
   a) subjecting a polyol to a reaction with an isocyanate-functional silane coupling agent to obtain a silane-grafted polyol,
   b) subjecting the silane-grafted polyol to a condensation reaction with a hydroxyl-functional polysiloxane, to obtain the polysiloxane-modified polyurethane, wherein the polysiloxane-modified polyurethane has a hydroxyl value of at least 30 mg KOH/g, and wherein the hardener comprises at least one isocyanate.

2. The coating composition according to claim 1, wherein the polyol is a polyester polyol.

3. The coating composition according to claim 1, wherein the polyol has a hydroxyl value of greater than 105 mg KOH/g.

4. The coating composition according to claim 1, wherein the isocyanate-functional silane coupling agent is selected from 3-(triethoxysilyl)propyl isocyanate, 3-(trimethoxysilyl)propyl isocyanate and mixtures thereof.

5. The coating composition according to claim 1, wherein the hydroxyl-functional polysiloxane is dihydroxy poly(dimethylsiloxane).

6. The coating composition according to claim 1, wherein the polysiloxane-modified polyurethane has a number average molecular weight Mn in the range of 2,000 to 5,000, as determined by gel permeation chromatography using a polystyrene standard with tetrahydrofuran as the mobile phase.

7. A method of coating a substrate, comprising applying the coating composition of claim 1 to a substrate and curing the coating composition to obtain a coated substrate.

8. A coated substrate obtainable by the method of claim 7.

9. The coated substrate according to claim 8, wherein the substrate is selected from the list consisting of aluminum, aluminum alloys, polycarbonate acrylonitrile butadiene styrene (PC/ABS), polycarbonate, polyacrylate, polyolefin, polyamide, polystyrene, glass, wood and stone.

* * * * *